(12) United States Patent
Xiao

(10) Patent No.: US 11,520,393 B1
(45) Date of Patent: Dec. 6, 2022

(54) DEVICE FOR IMPROVING CHARGING TRANSMISSION POWER FOR EXTERNAL EQUIPMENT BASED ON USB PORT OF COMPUTER

(71) Applicant: Shenzhen Tianyu Electronic Commerce Co., Ltd., Shenzhen (CN)

(72) Inventor: Mingdong Xiao, Meizhou (CN)

( * ) Notice: Subject to any disclaimer, the term of this patent is extended or adjusted under 35 U.S.C. 154(b) by 0 days.

(21) Appl. No.: 17/577,056

(22) Filed: Jan. 17, 2022

(51) Int. Cl.
*G06F 1/26* (2006.01)
*H02J 7/00* (2006.01)

(52) U.S. Cl.
CPC ............ *G06F 1/266* (2013.01); *H02J 7/0042* (2013.01)

(58) Field of Classification Search
CPC ............................... G06F 1/266; H02J 7/0042
USPC .................................................. 320/103, 107
See application file for complete search history.

(56) References Cited

U.S. PATENT DOCUMENTS

| 9,768,687 | B2 * | 9/2017 | Matsuki | .................. | H02M 1/08 |
| 2013/0043827 | A1 * | 2/2013 | Weinstein | ................. | H02J 7/00 |
| | | | | | 320/103 |
| 2021/0226529 | A1 * | 7/2021 | Hoi Man Cynthia | | ....................... |
| | | | | | H02J 7/0063 |
| 2022/0116237 | A1 * | 4/2022 | Pang | ....................... | G06F 1/263 |

FOREIGN PATENT DOCUMENTS

| CN | 111766812 A | * 10/2020 |
| CN | 215285108 U | * 12/2021 |

* cited by examiner

*Primary Examiner* — Richard V Muralidar
(74) *Attorney, Agent, or Firm* — Rumit Ranjit Kanakia

(57) ABSTRACT

The present utility model belongs to that technical field of data transmission and connection, in particular to a device for improving a charging transmission power for external equipment based on the USB port of a computer. The device of the present utility model specifically comprises a computer connecting terminal, an external equipment connecting terminal and a control circuit arranged between the computer connecting terminal and the external equipment connecting terminal for controlling the charging transmission power; wherein the control circuit is provided with a first main control chip, and an LX end of the first main control chip is connected with a fifth inductor; the other end of the fifth inductor is provided with a 102nd capacitor and an 18th capacitor; the other ends of the 102nd capacitor and the 18th capacitor are respectively grounded. On the one hand, the device can achieve the normal charging function of the USB port of a computer during data transmission between computer and device; on the other hand, the device can maintain stable exaggerated charging current and power supply during data transmission, thus solving the problems of battery capacity dropping and charge failure of the portable rechargeable virtual-reality device during use.

16 Claims, 8 Drawing Sheets

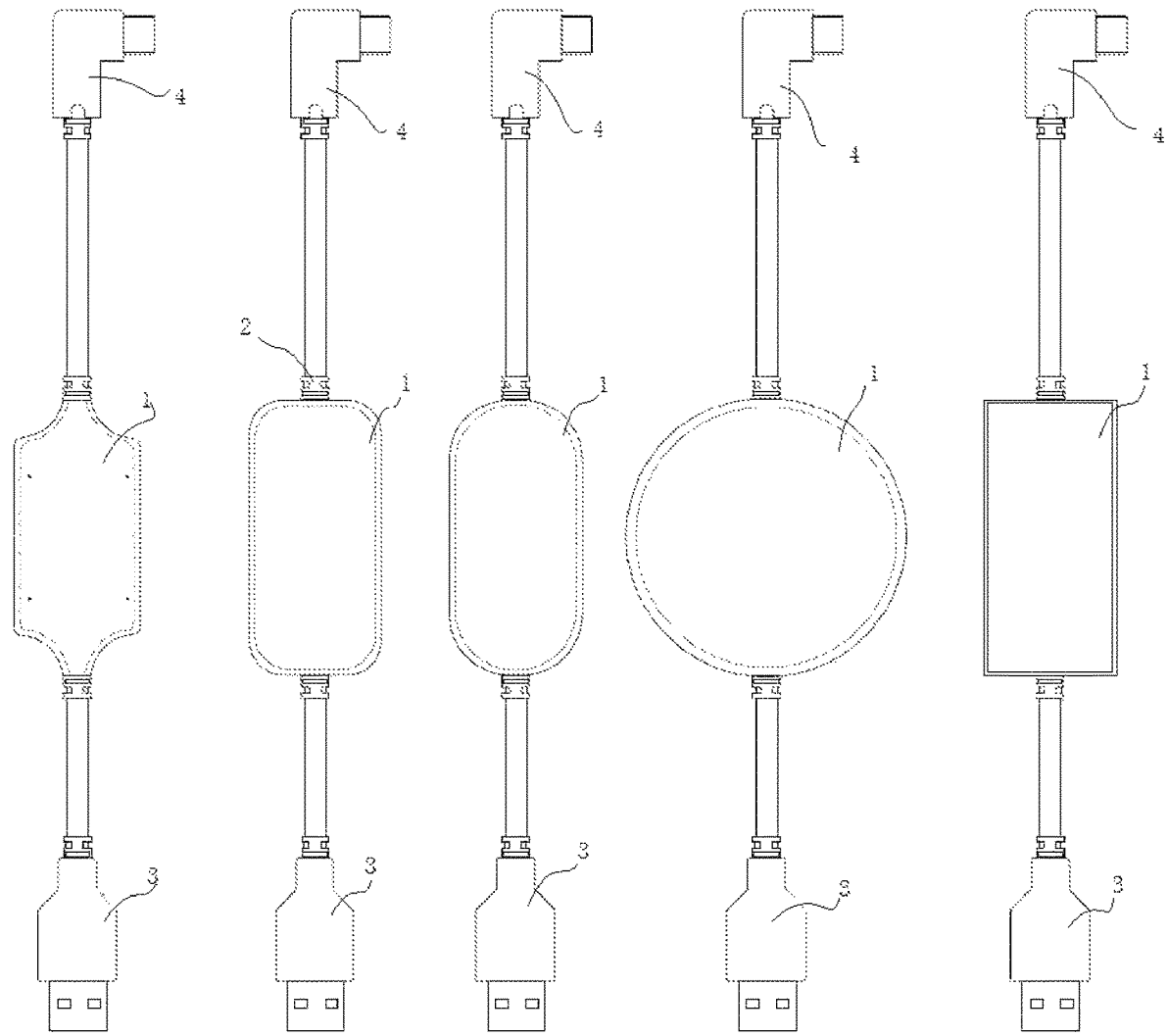

DEVICE FOR IMPROVING CHARGING TRANSMISSION POWER FOR EXTERNAL EQUIPMENT BASED ON USB PORT OF COMPUTER

TECHNICAL FIELD

The present utility model belongs to that technical field of data transmission and connection, in particular to a device for improving the charging transmission power for external equipment based on the USB port of a computer.

BACKGROUND

At present, when a USB port of a computer transmits data with Virtual-Reality (VR) equipment, it often appears that the normal charging function cannot be realized, or the stable charging current and power cannot be maintained in the process of data transmission. In addition, the traditional portable charging VR equipment often has problems such as charge failure, charging failure and so on.

That is, actually VR products often suffer from charging failure or failure to charge, thus affecting the experience of the user. In other words, the traditional computer USB interface has a low transmission power for charging external equipment.

Therefore, in view of the above technical problems that the normal charging function cannot be realized, the stable charging current and power cannot be maintained during data transmission between the computer USB port and VR equipment, and power down and charge failure often occur, that is, the traditional computer USB port has a low transmission power for charging external equipment, so it is urgent to design and develop a device for the charging improving transmission power for external equipment based on a USB port of a computer.

SUMMARY

The purpose of the present utility model is to provide a device for improving a charging transmission power for external equipment based on a USB port of a computer.

The purpose of the present utility model is realized as follows: a device for improving a charging transmission power for external equipment based on a USB port of a computer, specifically comprising a computer connecting terminal, an external equipment connecting terminal and a control circuit arranged between that computer connecting terminal and the external equipment connecting terminal for controlling the charging transmission power;

wherein the control circuit is provided with a first main control chip, and an LX (data pin) end of the first main control chip is connected with a fifth inductor; the other end of the fifth inductor is provided with a 102nd capacitor and an 18th capacitor; the other ends of the 102nd capacitor and the 18th capacitor are respectively grounded.

Furthermore, the control circuit is also provided with a second main control chip; a write protection end of the second main control chip is connected with a first resistor; a power supply end of the second main control chip is respectively connected with a HOLD end of the second main control chip, one end of a 114th capacitor, one end of a 16th resistor and one end of a third resistor;

the other end of the 114th capacitor is grounded; the other end of the 16th resistor is connected with a serial clock end of the second main control chip; the other end of the third resistor is connected with a data input end of the second main control chip.

Furthermore, the control circuit is also provided with a first crystal oscillator;

one end of the first crystal oscillator is connected with one end of a 125th capacitor; the other end of the first crystal oscillator is connected with one end of a 127th capacitor; the other end of the 125th capacitor and the other end of the 127th capacitor are respectively grounded.

Furthermore, a geometric wrapping part is arranged on the periphery of the control circuit.

Furthermore, the geometric wrapping part is rectangular, elliptical or circular.

Furthermore, the connection points of the transmission line at both ends of the geometric wrapping part are respectively provided with anti-folding parts.

Furthermore, the computer connecting terminal is detachably connected with the device.

Furthermore, the connection side between the transmission line and the computer connecting terminal is provided with an anti-folding part.

Furthermore, the g external equipment connecting terminal specifically adopts a "7" configuration.

Furthermore, the connection side between the transmission line and the external equipment connecting terminal is provided with an anti-folding part.

The device of the present utility model specifically comprises a computer connecting terminal, an external equipment connecting terminal and a control circuit arranged between the computer connecting terminal and the external equipment connecting terminal for controlling the charging transmission power; wherein the control circuit is provided with a first main control chip, and an LX (data pin) end of the first main control chip is connected with a fifth inductor; the other end of the fifth inductor is provided with a 102nd capacitor and an 18th capacitor; the other ends of the 102nd capacitor and the 18th capacitor are respectively grounded. On the one hand, the device can achieve the normal charging function of a USB port of a computer and a VR device during data transmission; on the other hand, the device can maintain stable exaggerated charging current and power supply during data transmission, thus solving the problems of battery capacity dropping and charge failure of the portable rechargeable VR device when in use.

That is to say, the solution of the present utility model solves the problem that the VR products have a bad user experience effect due to battery capacity dropping and charge failure.

BRIEF DESCRIPTION OF DRAWINGS

In order to explain the technical solution in the embodiment of the present utility model more clearly, the drawings needed in the description of the embodiment will be briefly introduced below. Obviously, the drawings in the following description are only some embodiments of the present utility model. For those skilled in the art, other drawings can be obtained according to these drawings without paying creative efforts.

FIG. 23a is a schematic diagram of the geometric wrapping part of the external structure of a device for improving the charging transmission power for external equipment based on a USB port of a computer according to this utility model;

FIG. 23b is the second schematic diagram of the geometric wrapping part of the external structure of a device for improving the charging transmission power for external equipment based on a USB port of a computer according to this utility model;

FIG. 23c is the third schematic diagram of the geometric wrapping part of the external structure of a device for improving the charging transmission power for external equipment based on a USB port of a computer according to this utility model;

FIG. 23d is the fourth schematic diagram of the geometric wrapping part of the external structure of a device for improving the charging transmission power for external equipment based on a USB port of a computer according to this utility model;

FIG. 23e is the fifth schematic diagram of the geometric wrapping part of the external structure of a device for improving the charging transmission power for external equipment based on a USB port of a computer according to this utility model;

Figure 1:
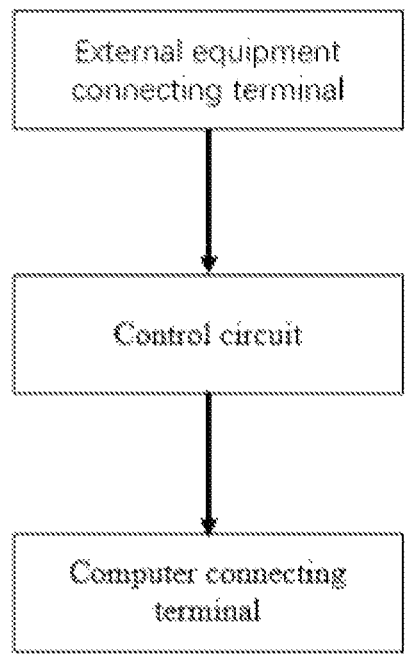
FIG. 1 is a schematic diagram of the architecture of a device for improving the charging transmission power for external equipment based on a USB port of a computer according to this utility model.
Figure 2:
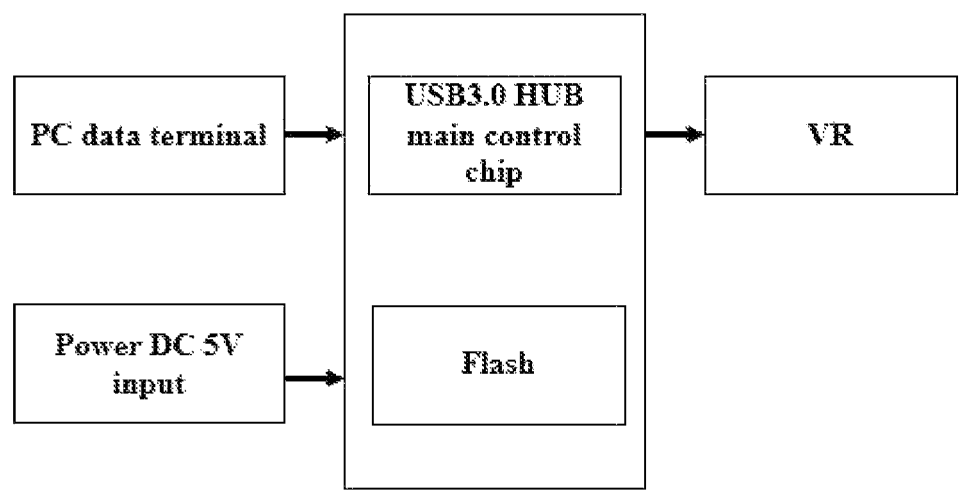
FIG. 2 is a schematic diagram of the second circuit diagram of the architecture of a device for improving the charging transmission power for external equipment based on a USB port of a computer according to this utility model.
Figure 3:
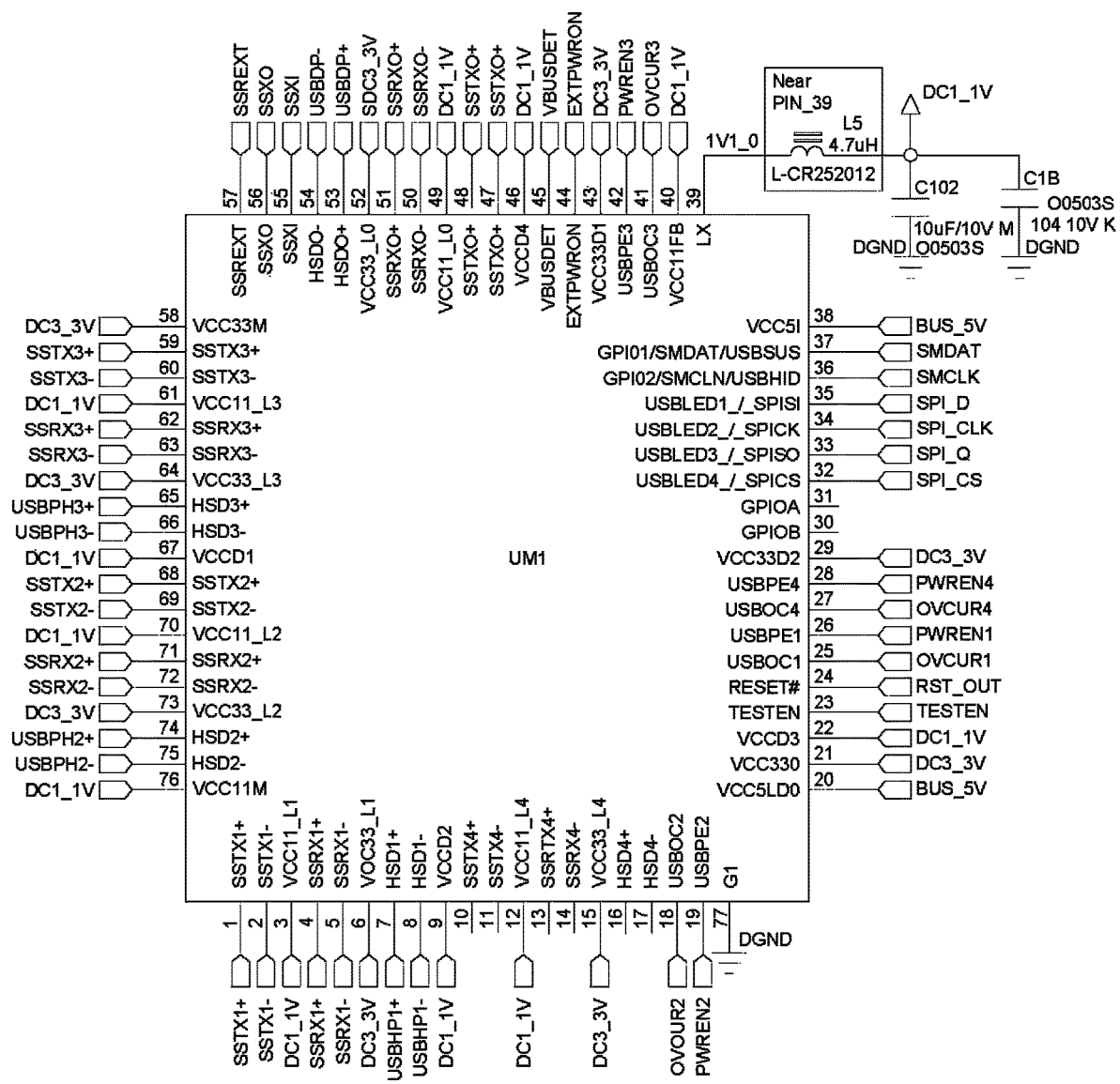
FIG. 3 is a schematic circuit diagram of the architecture control circuit of a device for improving the charging transmission power for external equipment based on a USB port of a computer according to this utility model.
Figure 4:
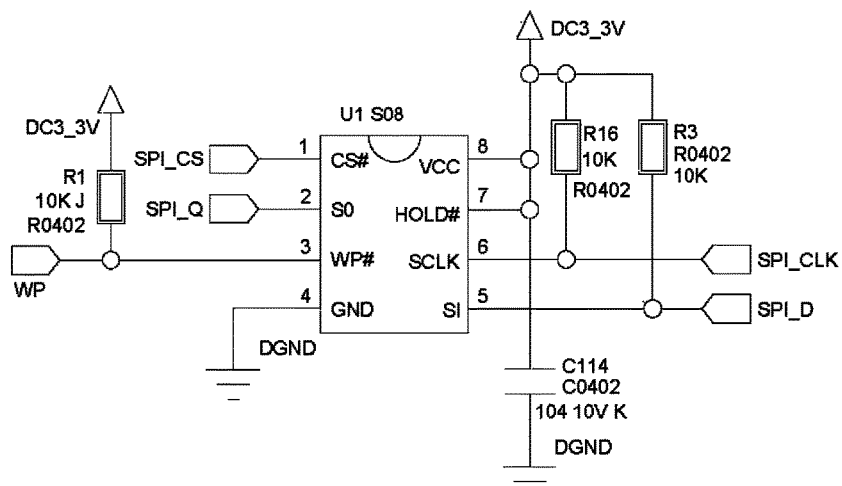
FIG. 4 is a schematic diagram of the second circuit diagram of the control circuit of the architecture of a device for improving the charging transmission power for external equipment based on a USB port of a computer according to this utility model.
Figure 5:
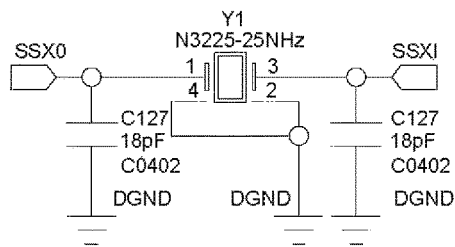
FIG. 5 is a schematic diagram of the third circuit diagram of the control circuit of the architecture of a device for improving the charging transmission power for external equipment based on a USB port of a computer according to this utility model.

in which:
1—Geometric wrapping part; 2—anti-folding part; 3—Computer connecting terminal; 4. External equipment connecting terminal;

UM1—First main control chip; L5—Fifth inductance; C102—102nd capacitor; C18—18th capacitor;

U1—Second main control chip; R1—First resistor; C114—114th capacitor; R16—16th resistor; R3—Third resistor; Y1—First crystal oscillator; C125—125th capacitor; C127—127th capacitor;

The purpose, function, features and advantages of the present utility model will be further explained with reference to the attached drawings.

DESCRIPTION OF EMBODIMENTS

In order to better understand the purpose, technical solution and advantages of this utility model and make it clearer, the present utility model will be further explained below with reference to the attached drawings and specific embodiments, and those skilled in the art can easily understand other advantages and effects of this utility model from the contents disclosed in this description.

The present utility model can also be implemented or applied by other different specific embodiments, and various details in this description can be modified and changed based on different viewpoints and applications without departing from the spirit of the present utility model.

It should be noted that if there are directional indications (such as up, down, left, right, front, back, . . . ) in this embodiment of the present utility model, the directional indication is only used to explain the relative positional relationship, movement situation and the like among components in a certain posture (as shown in the attached figures), and if the specific posture changes, the directional indication will change accordingly.

In addition, if there are descriptions of "first" and "second" in the embodiments of the present utility model, the descriptions of "first" and "second" are only used for descriptive purposes, but cannot be understood as indicating or implying their relative importance or implicitly indicating the number of indicated technical features. Therefore, the features defined with "first" and "second" can explicitly or implicitly include at least one of the features. Secondly, the technical solutions of various embodiments can be combined with each other, but they must be implementable for those skilled in the art. When the combination of technical solutions is contradictory or impossible to carry out, it should be considered that the combination of such technical solutions does not exist and is not within the scope of protection required by this utility model.

The present utility model will be further explained with the attached drawings below.

As shown in FIGS. 1-23, the present utility model provides a device for improving the charging transmission power for external equipment based on a USB port of a computer.

The device specifically comprises a computer connecting terminal 3, an external equipment connecting terminal 4 and a control circuit arranged between the computer connecting terminal 3 and the external equipment connecting terminal 4 for controlling the charging transmission power.

A first main control chip UM1 is arranged in the control circuit, and the (data pin) LX end of the first main control chip UM1 is connected with a fifth inductor L5; the other end of the fifth inductor L5 is provided with a 102nd capacitor C102 and an 18th capacitor C18; the other ends of the 102nd capacitor C102 and the 18th capacitor C18 are respectively grounded.

The control circuit is also provided with a second main control chip U1; the write protection end of the second main control chip U1 is connected with a first resistor R1; the power supply end of the second main control chip U1 is connected with the U1HOLD end of the second main control chip U1, one end of the 114th capacitor C114, one end of the 16th resistor R16 and one end of the third resistor R3 respectively;

the other end of the 114th capacitor C114 is grounded; the other end of the 16th resistor R16 is connected with the serial clock terminal of the second main control chip U1; the other end of the third resistor R3 is connected with the data input end of the second main control chip U1.

The control circuit is also provided with a first crystal oscillator Y1;

one end of the first crystal oscillator Y1 is connected to one end of a 125th capacitor C125; the other end of the first crystal oscillator Y1 is connected to one end of a 127th capacitor C127; the other end of the 125th capacitor C125 and the other end of the 127th capacitor C127 are respectively grounded.

A geometric wrapping part 1 is arranged on the periphery of the control circuit.

The geometric wrapping part 1 is rectangular, elliptical or circular.

Anti-folding parts 2 are respectively arranged at the connection points of transmission lines at both ends of the geometric wrapping part 1.

The computer connecting terminal 3 is detachably connected with the device.

The connecting side between the transmission line of the computer connecting terminal 3 is provided with an anti-folding part 2.

The external equipment connecting terminal 4 specifically adopts a "7" configuration.

The connecting side between the transmission line and the external equipment connecting terminal 4 is provided with an anti-folding part 2.

Specifically, in the specific embodiment of the present utility model solution, a device for improving the charging transmission power for external equipment based on a USB port of a computer is provided. The device is provided with a USB 3.0 data communication protocol, and has a current charging protocol program design and an electronic hardware system design, and thus can achieve the normal charging function between a computer USB port and VR equipment during data transmission, and can maintain stable charging current and power during data transmission, thus solving the problems of charge failure and charging failure of portable charging VR equipment during use, achieving the expected effect and the outstanding effect of solving practical applications.

The specific principle process is as below: VR equipment needs to be separately connected to the charger as the main charging power supply for charging, and it does not interact with the power supply provided by the USB interface of the computer. After connecting to an external power supply, an exaggerated charging power is realized, so that VR equipment can be used normally without battery capacity dropping or affecting data transmission.

In this solution, the external access power supply is used as the main power supply, and specifications of the chargers are 5-12V/1-3 A.

Moreover, the solution of the present utility model realizes this function by two parts, namely, the software program part and the hardware PCB circuit backplane part, and the devices or methods built by these two parts do not have abnormal phenomena such as frame dropping and jamming of VR images due to awful data transmission. In other words, in the program design, an MCU firmware program is used to transfer 3.0 data to reduce data transmission loss. In the design of circuit hardware, the original VR device charger can be used as an external DC voltage source, and does not have crosstalk with DC voltage of the computer.

After the solution is applied to an actual use scene, it solves the problem that the user experience is affected by the battery capacity dropping and charge failure in the VR product. After actual verification, the present utility model achieves a good enhancement for the low power supply of the USB interface of the computer for external equipment.

Specifically, using an extended Type-A to C data cable as a transmission cable, the charging power can reach the allowed maximum value of the VR equipment, about 3-10 W, with a votable of 5-12V and a current of 1-3 A.

Figure 6:
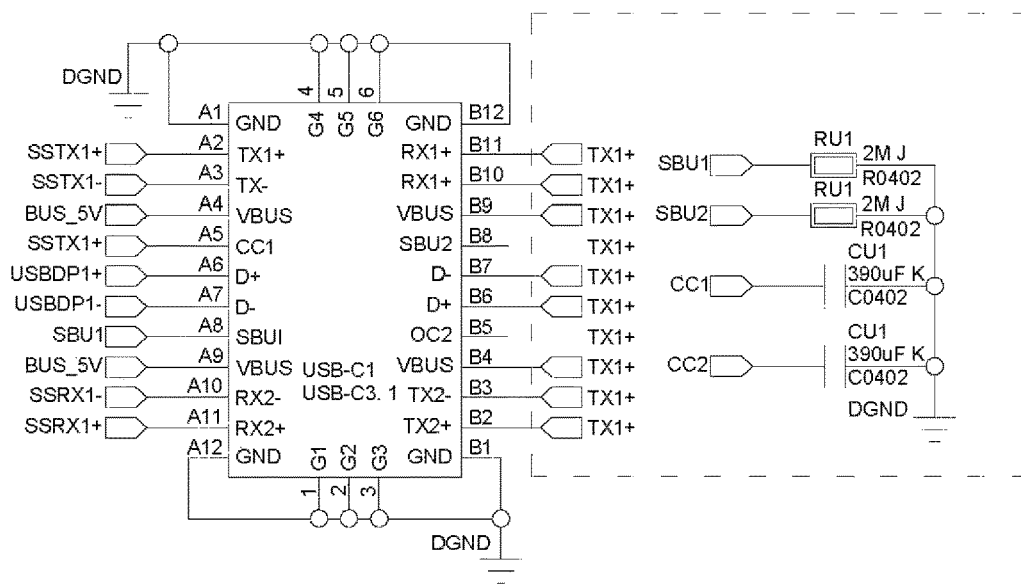
FIG. 6 is a schematic diagram of the fourth circuit diagram of the control circuit of the architecture of a device for improving the charging transmission power for external equipment based on a USB port of a computer according to this utility model.
Figure 7:
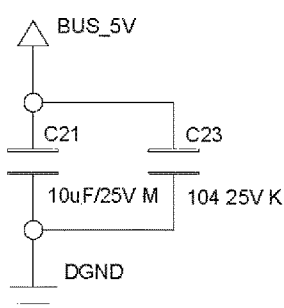
FIG. 7 is a schematic diagram of the fifth circuit diagram of the control circuit of the architecture of a device for improving the charging transmission power for external equipment based on a USB port of a computer according to this utility model.
Figure 8A:
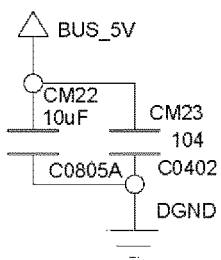
FIG. 8a is a schematic circuit diagram of the sixth Near Pin 38 of the control circuit of the architecture of a device for improving the charging transmission power for external equipment based on a USB port of a computer according to this utility model.
Figure 8B:
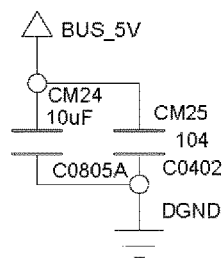
FIG. 8b is a schematic diagram of the sixth Near Pin 20 circuit diagram of the control circuit of the architecture of a device for improving the charging transmission power for external equipment based on a USB port of a computer according to this utility model.
Figure 8C:
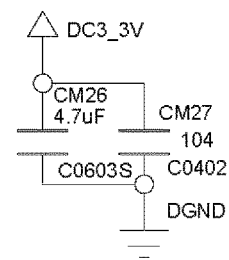
FIG. 8c is a schematic circuit diagram of the sixth Near Pin 21 of the control circuit of the architecture of a device for improving the charging transmission power for external equipment based on a USB port of a computer according to this utility model.
Figure 9:
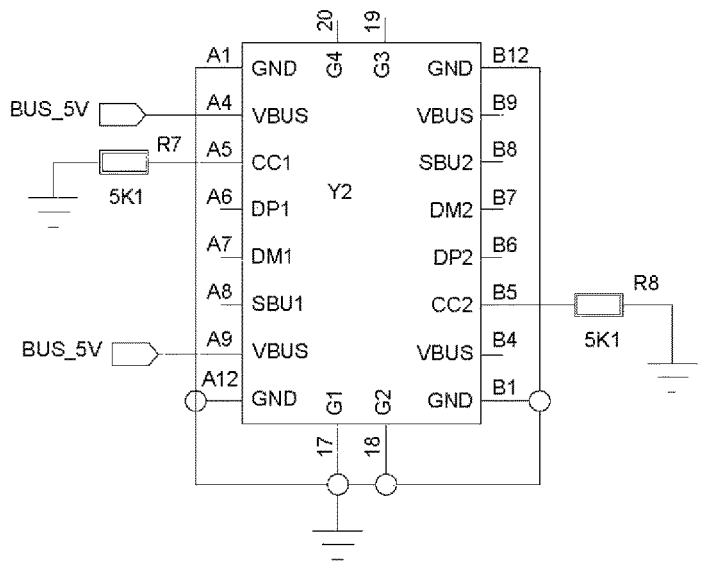
FIG. 9 is a schematic diagram of the seventh circuit diagram of the control circuit of the architecture of a device for improving the charging transmission power for external equipment based on a USB port of a computer according to this utility model.
Figure 10:
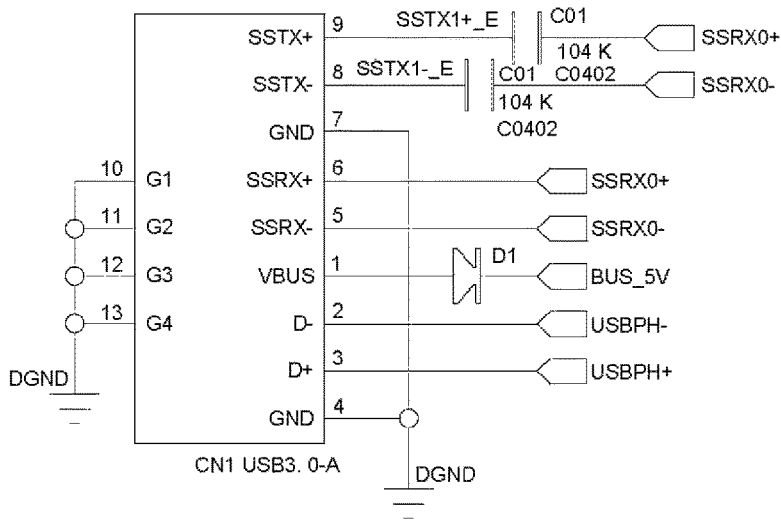
FIG. 10 is a schematic diagram of the eighth circuit diagram of the control circuit of the architecture of a device for improving the charging transmission power for external equipment based on a USB port of a computer according to this utility model.
Figure 11:
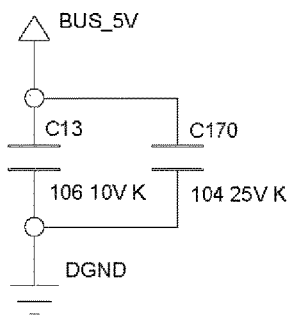
FIG. 11 is a schematic diagram of the ninth circuit diagram of the architecture of a device for improving the charging transmission power for external equipment based on a USB port of a computer according to this utility model.
Figure 12:
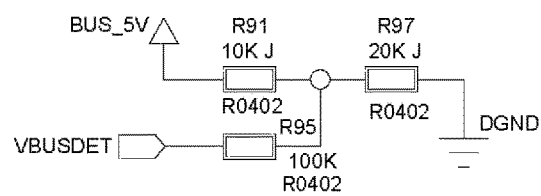
FIG. 12 is a schematic diagram of the tenth circuit diagram of the control circuit of the architecture of a device for improving the charging transmission power for external equipment based on a USB port of a computer according to this utility model.
Figure 13:
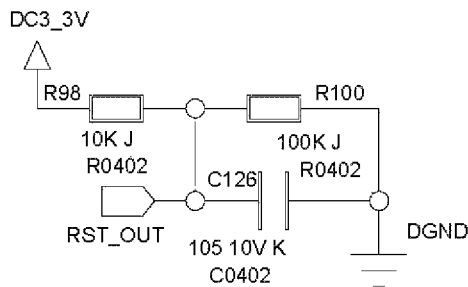
FIG. 13 is a schematic diagram of the eleventh circuit diagram of the architecture of a device for improving the charging transmission power for external equipment based on a USB port of a computer according to this utility model.
Figure 14:
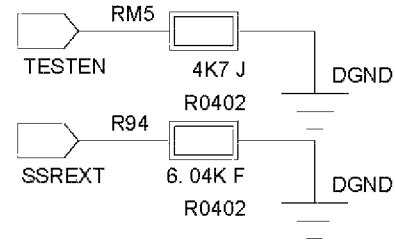
FIG. 14 is a schematic diagram of twelve circuit diagrams of the architecture of a device for improving the charging transmission power for external equipment based on a USB port of a computer according to this utility model.
Figure 15:
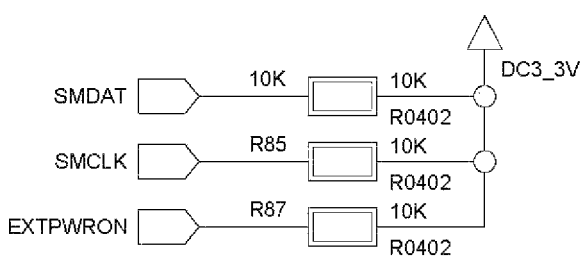
FIG. 15 is a schematic circuit diagram of the thirteenth circuit diagram of the architecture of a device for improving the charging transmission power for external equipment based on a USB port of a computer according to this utility model.
Figure 16:
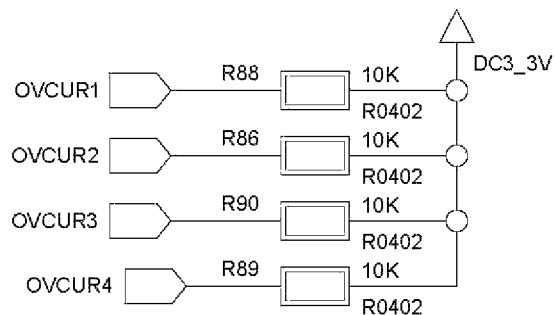
FIG. 16 is a schematic diagram of the fourteenth circuit diagram of the architecture of a device for improving the charging transmission power for external equipment based on a USB port of a computer according to this utility model.
Figure 17:
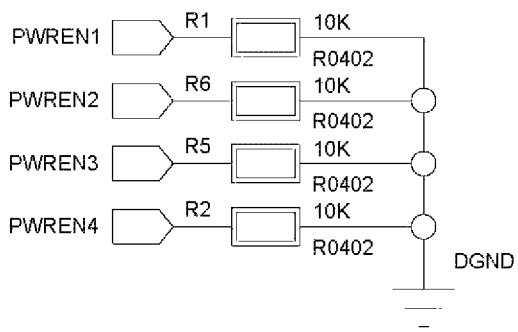
FIG. 17 is a schematic diagram of the fifteenth circuit diagram of the architecture of a device for improving the charging transmission power for external equipment based on a USB port of a computer according to this utility model.
Figure 18:
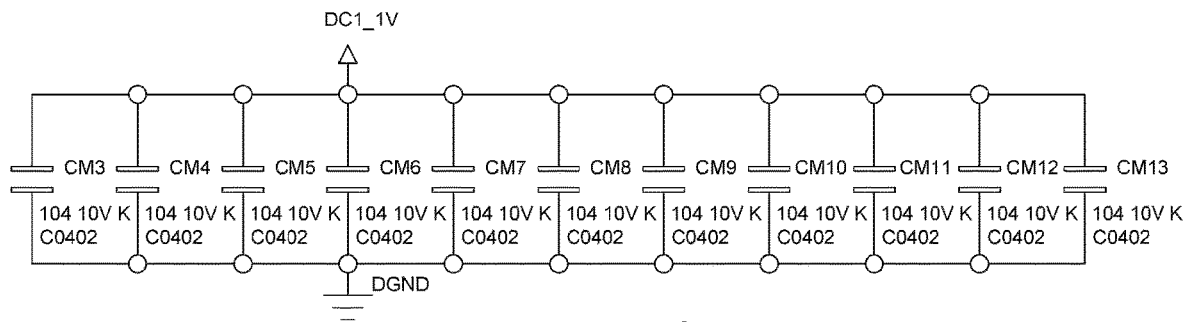
FIG. 18 is a schematic diagram of the sixteenth circuit diagram of the architecture of a device for improving the charging transmission power for external equipment based on a USB port of a computer according to this utility model.
Figure 19:
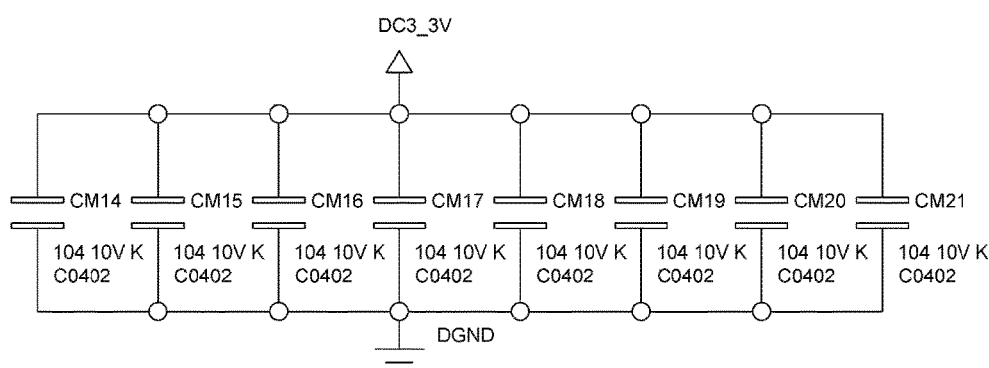
FIG. 19 is a schematic circuit diagram of seventeen control circuits of the architecture of a device for improving the charging transmission power for external equipment based on a USB port of a computer according to this utility model.
Figure 20:
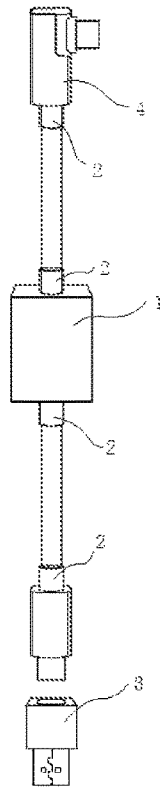
FIG. 20 is a schematic diagram of the external structure of a device for improving the charging transmission power for external equipment based on a USB port of a computer according to this utility model.
Figure 21:
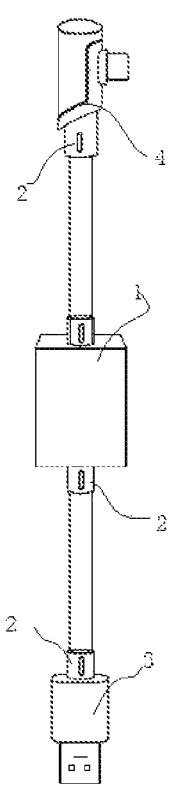
FIG. 21 is the second schematic diagram of the external structure of a device for improving the charging transmission power for external equipment based on a USB port of a computer according to this utility model.
Figure 22:
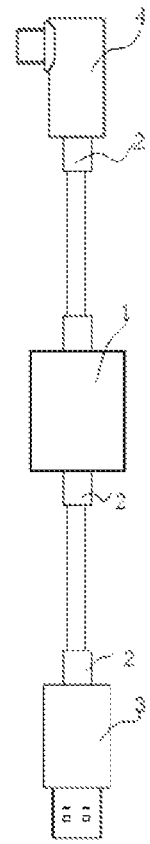
FIG. 22 is the second schematic diagram of the external structure of a device for improving the charging transmission power for external equipment based on a USB port of a computer according to this utility model.

The circuit of the right virtual frame shown in FIG. 6 involves CC1, CC2, SBU1 and SBU2, which are all located inside the plug, and are not implemented on an adapter board; TYPE-C is realized by way of wire solder holes. As shown in FIG. 10, the wiring method adopted by USB3.0 is processed according to a set length threshold.

That is, the device of the present utility model specifically includes a computer connecting terminal 3, an external equipment connecting terminal 4 and a control circuit arranged between the computer connecting terminal 3 and the external equipment connecting terminal 4 for controlling the charging transmission power; a first main control chip UM1 is arranged in the control circuit, and a fifth inductor L5 is connected to the (data pin) LX end of the first main control chip UM1; a 102nd capacitor C102 and an 18th capacitor C18 are arranged at the other end of the fifth inductor L5; the other ends of the 102nd capacitor C102 and the 18th capacitor C18 are respectively grounded. On the one hand, the device can achieve a normal charging function during data transmission between a computer USB port and VR equipment; on the other hand, the device can maintain stable exaggerated charging current and power supply during data transmission, thus solving the problem of battery capacity dropping and charge failure of portable charging VR equipment during use.

That is, the solution of the present utility model solves the problem that the actual VR products have a bad user experience effect due to battery capacity dropping and charge failure.

The above examples only indicate several embodiments of the present utility model, and their descriptions are more specific and detailed, but they cannot be construed as limiting the patent scope of the present utility model. It should be noted that for those skilled in the art, under the premise of not deviating from the concept of this utility model, several changes and improvements can be made, and all changes and improvements belong to the protection scope of this utility model. Therefore, the scope of protection of this utility model patent shall be defined by the appended claims.

What is claimed is:

1. A device for improving a charging transmission power for external equipment based on a USB port of a computer, specifically comprising: a computer connecting terminal, an external equipment connecting terminal, and a control circuit configured to control the charging transmission power;
wherein the control circuit is between the computer connecting terminal and the external equipment connecting terminal;
the control circuit comprises:
a first main control chip having:
a first data pin (LX) having an end,
a first inductor having a first end and a second end,
a first capacitor having a first end and a second end,
a second capacitor having a first end and a second end,
the LX end of the first main control chip is connected to the first end of the first inductor;
the second end of the first inductor is directly connected to the first end of the first capacitor and the first end of the second capacitor; and
the second end of the first capacitor and the second end of the second capacitor are respectively grounded.

2. The device for improving a charging transmission power for external equipment based on a USB port of a computer according to claim 1, wherein the control circuit further comprises a second main control chip;
the second main control chip having:
a write protection end,
a power supply end,
a HOLD end,
a serial clock end,
a data input end,
a first resistor having a first end and a second end,
a second resistor having a first end and a second end,
the third capacitor having a first end and a second end,
the write protection end of the second main control chip is connected to the first end of the first resistor;
the power supply end of the second main control chip is respectively connected to the HOLD end of the second main control chip, the first end of the third capacitor, the first end of the first resistor and the first end of the second resistor;
the second end of the third capacitor is grounded;
the second end of the first resistor is connected to the serial clock end of the second main control chip;
the second end of the second resistor is connected to the data input end of the second main control chip.

3. The device for improving a charging transmission power for external equipment based on a USB port of a computer according to claim 1, wherein the control circuit further comprises a first crystal oscillator;
the first crystal oscillator having a first end and a second end comprises:
a fourth capacitor having a first end and a second end,
a fifth capacitor having a first end and a second end,
the first end of the first crystal oscillator is connected to the first end of the fourth capacitor;
the second end of the first crystal oscillator is connected to the first end of the fifth capacitor;
the second end of the fourth capacitor and a second end of the fifth capacitor are respectively grounded.

4. The device for improving a charging transmission power for external equipment based on a USB port of a computer according to claim 1, wherein a geometric wrapping part is arranged on the periphery of the control circuit.

5. The device for improving a charging transmission power for external equipment based on a USB port of a computer according to claim 4, wherein the geometric wrapping part is at least one of rectangular, elliptical or circular.

6. The device for improving a charging transmission power for external equipment based on a USB port of a computer according to claim 5, wherein connection points of transmission lines at both ends of the geometric wrapping part includes anti-folding parts.

7. The device for improving a charging transmission power for external equipment based on a USB port of a computer according to claim 1, wherein the computer connecting terminal is detachably connected with the device.

8. The device for improving a charging transmission power for external equipment based on a USB port of a computer according to claim 1, wherein connection side between the transmission line and the computer connecting terminal includes an anti-folding part.

9. The device for improving a charging transmission power for external equipment based on a USB port of a computer according to claim 1, wherein the external equipment connecting terminal specifically adopts a "7" configuration.

10. The device for improving a charging transmission power for external equipment based on a USB port of a computer according to claim 1, wherein the connection side between the transmission line of the external equipment connecting terminal includes an anti-folding part.

11. The device for improving a charging transmission power for external equipment based on a USB port of a computer according to claim 2, wherein a geometric wrapping part is arranged on the periphery of the control circuit.

12. The device for improving a charging transmission power for external equipment based on a USB port of a computer according to claim 3, wherein a geometric wrapping part is arranged on the periphery of the control circuit.

13. The device for improving a charging transmission power for external equipment based on a USB port of a computer according to claim 7, wherein the connection side between the transmission line and the computer connecting terminal includes an anti-folding part.

14. The device for improving a charging transmission power for external equipment based on a USB port of a computer according to claim 9, wherein connection side between the transmission line of the external equipment connecting terminal includes an anti-folding part.

15. The device for improving a charging transmission power for external equipment based on a USB port of a computer according to claim 2, wherein a second data pin is connected to a third resistor and a third data pin is connected to a fourth resistor.

16. The device for improving a charging transmission power for external equipment based on a USB port of a computer according to claim 1, wherein a second data pin is connected to a third capacitor and a third data pin is connected to a fourth capacitor.

\* \* \* \* \*